United States Patent [19]

Holubka

[11] Patent Number: 4,515,926

[45] Date of Patent: May 7, 1985

[54] COATING COMPOSITION COMPRISING BIS-DIENE OLIGOMERS AND BIS-DIENEOPHILE OLIGOMERS

[75] Inventor: Joseph W. Holubka, Livonia, Mich.

[73] Assignee: Ford Motor Company, Dearborn, Mich.

[21] Appl. No.: 456,067

[22] Filed: Jan. 6, 1983

[51] Int. Cl.$^3$ .................... C08L 67/06; C08L 71/06
[52] U.S. Cl. ................... 525/449; 525/451; 525/452; 528/73
[58] Field of Search ............ 525/528, 532, 454, 455, 525/531, 449, 451, 452

[56] References Cited

U.S. PATENT DOCUMENTS 4,273,909  6/1981  Arco ..................... 528/75
4,424,334  1/1984  Chattha ................. 525/528

Primary Examiner—John C. Bleutge
Assistant Examiner—Robert E. L. Sellers, II
Attorney, Agent, or Firm—Peter D. McDermott; Roger L. May

[57] ABSTRACT

Novel thermosetting, solvent-based, crosslinkable and chain-extendable coating compositions are provided. The coating compositions are suitable to be formulated as high solids coating compositions and comprise bis-diene oligomers, bis-dieneophile oligomers, crosslinking agent, organic solvent and, preferably, catalyst. The composition cures at elevated temperature to provide a coating on a substrate, such as sheet steel or the like, which is highly resistant to corrosion, humidity and solvents and provides corrosion protection for the substrate.

24 Claims, No Drawings

COATING COMPOSITION COMPRISING BIS-DIENE OLIGOMERS AND BIS-DIENEOPHILE OLIGOMERS

TECHNICAL FIELD

This invention relates to novel coating compositions comprising low molecular weight bis-diene oligomers and low molecular weight bis-dieneophile oligomers, which coating composition cures at elevated cure temperature by chain-extension cyclo-addition polymerization reaction. A portion or all of one or both oligomers provide one or more crosslinking functionality reactive with conventional aminoplast crosslinking agents. The invention provides methods of coating a substrate, novel coatings made by such methods and coated substrates comprising such coatings. The coating compositions of the invention are highly stable in storage at temperatures below cure temperature. Cured coatings of the present invention are highly resistant to corrosion, humidity and solvents and provide excellent protection against same for the underlying substrate.

RELATED APPLICATIONS

This application is related to application Ser. No. 455,678, Ser. No. 455,718, and Ser. No. 455,719, all filed Jan. 5, 1983, and to application Ser. No. 456,068 filed Jan. 6, 1983 and to application Ser. No. 458,119 filed Jan. 14, 1983.

BACKGROUND ART

Solvent based coating compositions are known which employ high molecular weight (e.g. 2,000 to 10,000) polymer resins having crosslinking functionality, and a suitable crosslinking agent. Typically, such coating compositions are applied to a substrate, for example, by spraying, and are then cured by baking the coated substrate at an elevated temperature suitable to drive off the organic solvent and to promote the crosslinking reaction. The resulting thermoset coating, if sufficiently humidity and solvent resistant, can provide aesthetic and functional advantages including corrosion protection for the underlying substrate.

Coating compositions comprising such high molecular weight polymer resins typically comprise only 25% to 50% solids content so as to be sprayable or otherwise conveniently applicable to a substrate. The viscosity of coating compositions of higher solids content is typically too high for this purpose. Conventional epoxy ester based automotive vehicle spray primers, for example, typically have a volatile organic content ("VOC") of approximately 540 g/l.

Elimination of the volatile organic solvent portion during curing of these conventional low-solids coating compositions can present toxicity and flammability hazards in some cases. Furthermore, bulk volume of these coating compositions is relatively large and therefore presents undesirable material handling difficulties and added expense. Furthermore, excessive solvent losses and/or solvent recovery equipment add considerable expense to the coating operation. Recently, governmental regulations on hydrocarbon emissions, particularly applicable to automotive coating operations, mandate a significant reduction in volatile organic content for coating compositions. Emissions treatment equipment can be employed to achieve the specified emissions limit. Such treatment presents significant additional expense, however, and there is a great need to provide coating compositions of VOC reduced near to, or preferably even lower than, the levels set by the governmental regulations.

In response to these concerns, high solids coating compositions have been suggested which, typically, employ low molecular weight multi-functional adducts or copolymers in combination with multi-functional crosslinking agents. These high solids coating compositions are less viscous and, therefore, can be applied by spraying, for example, with far lower VOC than was possible with conventional epoxy ester based coating compositions or other conventional coating compositions comprising high molecular weight polymer resins. After application to the substrate, such high solids coating compositions are cured by baking at a cure temperature, that is, at an elevated temperature suitable to drive off the volatile organic content and to promote polymerization and crosslinking of the multi-functional low molecular weight component(s).

In this regard, teaching is found in U.S. Pat. No. 2,568,885 to Dreyfus, which sugguests that highly polymeric materials can be produced by reaction between bifunctional molecules containing as reactive radicals two urethane radicals or two amino, hydroxyl or carboxyl radicals, or one urethane and one amino, hydroxyl or carboxyl radical. Dreyfus employs no crosslinking agent and no crosslinking reaction appears possible with the polymeric compounds formed by Dreyfus.

The teaching in U.S. Pat. No. 4,101,603 to Smith et al suggests high solids coating compositions comprising a polycaprolactone derivative and a mixture of a methylolated melamine (e.g., hexamethoxymethylmelamine) and a low molecular weight polyol and, optionally, solvent and catalyst. The polycaprolactone derivative used in the coating composition of Smith et al can be, among others, the reaction product of polycaprolactone polyol, polyisocyanate and anhydride of a polycarboxylic acid, i.e., a carboxyl modified polycaprolactone urethane adduct which is generally water insoluble.

In U.S. Pat. No. 3,248,371 to Damusis, polyurethane coating compositions are suggested comprising a multifunctional blocked isocyanate-terminated polyether-based urethane intermediate, and as crosslinking/deblocking agent, hydroxy tertiary amine which can be hydroxy-terminated nitrogen-containing polyether-based polyurethane intermediates.

In U.S. Pat. No. 3,442,974 to Bremmer, a shelf stable epoxy resin system is suggested which comprises a polyepoxide and the adduct of diisocyanate and phenolic hydroxyl compound. It suggests that upon heating this mixture, the phenolic hydroxyl groups are released and react with the epoxy groups forming an ether linkage and a secondary hydroxyl group and the de-blocked diisocyanate reacts with the secondary hydroxyl group. Use in varnishes, for example, is suggested.

Typically, high solids coating compositions yield cured coatings having polymeric networks that differ significantly in structure and morphology from the polymeric networks provided by conventional, low solids coating compositions comprising high molecular weight polymers. The physical properties of the coatings provided by such high solids coating compositions can differ significantly from those of the cured coatings provided by the conventional, low solids coating compositions. In particular, the cured coatings obtained from known high solids coating compositions can be inferior in that they can be less flexible, less solvent resistant, less adherent to the substrate and/or for other reasons provide less corrosion protection for the underlying substrate. Accordingly, it would be highly desirable to provide a coating composition comprising low molecular weight materials suitable for use in high solids, solvent based coating compositions and yet which, upon curing, form coatings having physical properties comparable to those obtained from conventional low solids solvent based coating compositions.

Accordingly, it is an object of the present invention to provide novel coating compositions which cure at elevated temperature, in situ, on the surface of a substrate to form high polymers, that is, polymeric networks similar in structure and morphology to those obtainable through use of conventional low solids, solvent-based coating compositions.

It is another object of the invention to provide a coating composition of sufficiently low VOC to meet governmental guidelines. It is also an object of the invention to provide a coating composition which can be applied to a substrate by spraying or other known method.

It is a further object of the invention to provide a coating composition which has a long shelf-life, that is, a coating composition which is highly stable below cure temperature and which, upon being cured at elevated temperature provides a thermoset coating having excellent humidity and solvent resistance and corrosion protection for the underlying substrate.

It is another object of the invention to provide a method of making a coating on a substrate, which coating has a polymeric network similar in structure and morphology to that provided by conventional low solids solvent-based coating compositions and having similar advantageous physical properties including, for example, humidity and solvent resistance and corrosion protection for the underlying substrate. Additional aspects and advantages of the invention will be apparent from the following description thereof.

DISCLOSURE OF THE INVENTION

This invention provides a novel, thermosetting, solvent-based coating composition comprising:

A. bis-diene oligomers of number average molecular weight about 300–5000, more preferably about 300–1200, having the general formula A—R—A', wherein A and A' are the same or different and each comprises a substituted or unsubstituted monovalent diene moiety;

B. bis-dieneophile oligomers of number average molecular weight about 400–5000, more preferably about 400–1,300, having the general formula B—R'—B', wherein B and B' are the same or different and each comprises a substituted or unsubstituted dieneophile moiety reactive at elevated temperature with the aforesaid diene moieties A and A', the aforesaid R and R' being the same or different and each being a bivalent hydrocarbon linking moiety which is substantially unreactive with each other, with A, A', B and B', wherein at least one of A—R—A' and B—R'—B' bears crosslinking functionality such as, for example, hydroxy, amino, carboxy, or the like;

C. crosslinking agent substantially reactive with the crosslinking functionality of A—R—A' or B—R'—B' at the aforesaid elevated cure temperature; and D. organic solvent.

According to another aspect of the invention, a method of making a corrosion, solvent and humidity resistant coating on a substrate comprises applying to the substrate the novel, solvent-based, thermosetting coating composition of the invention and subsequently subjecting the coating to an elevated temperature for a time period sufficient to substantially cure the coating layer. According to such method, the above-described novel, thermosetting, solvent-based, crosslinkable coating composition is applied to a substrate, for example, a bare metal surface. The bis-dieneophile oligomers react at the aforesaid elevated cure temperature with the bis-diene oligomers to provide chain-extension polymerization. The crosslinking functionality of the resulting polymer reaction product undergoes crosslinking reaction with the crosslinking agent.

The coating compositions of the present invention have been found especially advantageous for use as high solids primer compositions suitable to be applied by spraying techniques. More specifically, high solids coating compositions according to preferred embodiments of the invention, discussed below, formulated, for example, at VOC as low as about 350 g/l (2.9 lb./gal.) to about 400 g/l (3.4 lb./gal.) are found to have viscosity as low as about 30 sec. to about 40 sec., #4 Ford Cup at 27° C., and so are well suited to spray application techniques. Accordingly, the coating compositions of the invention provide ease of material handling and less expense than previously known coating compositions which were sprayable only at higher VOC. Furthermore, the coating compositions of the invention are useful in meeting or exceeding governmental guidelines regarding hydrocarbon emissions, with a reduction or elimination of emissions treatment and emissions treatment equipment. In addition, reduction in the amount of hydrocarbon solvent used in the coating composition provides direct cost advantage.

Unlike various previously suggested high solids coating compositions, the coating compositions of the present invention provide low VOC and cure-response advantages without sacrifice of advantageous physical properties in the cured coating. On the contrary, when applied, for example, over a metallic substrate, such as when applied as an automotive vehicle primer coat over bare sheet steel, cured coatings according to the invention have been found to provide excellent adhesion to the substrate, excellent humidity resistance, and excellent corrosion resistance in comparison to other commercially available high solids coating compositions of similar nature.

The coating compositions of the invention have been found also to provide excellent surface appearance, which is a significant advantage in the use of same for consumer products such as, for example, automotive vehicles and household appliances, wherein aesthetic considerations are important.

Other features and advantages of this invention will become more apparent from the following detailed description thereof, including the preferred embodiments and best mode of the invention.

DETAILED DESCRIPTION OF THE INVENTION

Suitable bis-diene oligomers for use in the novel coating compositions of the invention include many well known to the skilled of the art, a wide variety of which are readily commercially available. As used herein, the term "diene" refers to substituted or unsubstituted 1,3- conjugated alkadienyls and cycloalkadienyls. Preferably the bis-diene oligomers are of number average molecular weight about 300–5000, more preferably, for high solids coating compositions, about 300–1200, since these have been found (in use with preferred bis-dienophile oligomers described below) to provide high-solids coating compositions which can be easily applied to a substrate by spraying or by other means at a calculated volatile organic content as low as about 350 g/l (2.9 lb./gal.) or less.

Preferred bis-diene oligomers include, for example, those of formula A—R—A', wherein R is a bivalent hydrocarbon linking moiety which preferably is substantially unreactive with A and A'. That is, in the compound A—R—A', the linking moiety —R— preferably comprises no functionality substantially reactive with either the A or A' moiety. The diene moieties A and A' are the same or different and each is a substituted or unsubstituted monovalent olefinic moiety having 1,3-conjugated double bonds according to formula I:

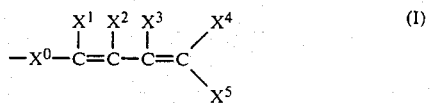

wherein:

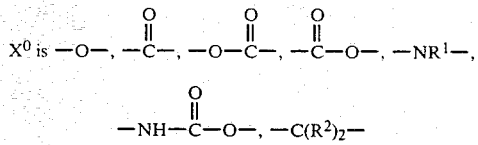

or the like, wherein $R^1$ is hydrogen, straight, branched or cyclo alkyl, aryl, arylalkyl, or the like, and each $R^2$ is the same or different and each is hydrogen, hydroxy, carboxy, amine, straight, branched or cyclo alkyl, aryl, arylalkyl, or the like, each alkyl, aryl and arylalkyl moiety of $R^1$ and $R^2$ being unsubstituted or mono- or poly-hydroxy substituted or mono- or poly-carboxy substituted or mono- or poly-amino substituted; and $X^1$, $X^2$, $X^3$, $X^4$ and $X^5$ are the same or different and each is hydrogen, hydroxy, carboxy, amino, straight or branched or cyclo-alkyl, aryl, arylalkyl, cyano, nitro or the like, or $X^1$ and $X^5$ together are alkylene, —O—, —$NR^1$— where $R^1$ is as defined above, or like divalent group (resulting in a cyclic diene moiety), each alkyl, aryl, arylalkyl and alkylene moiety of $X^1$, $X^2$, $X^3$, $X^4$ and $X^5$ being unsubstituted or mono- or poly-hydroxy substituted or mono- or poly-carboxy substituted or mono- or poly-amino substituted. Preferably, A and A' are each:

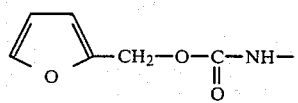

Suitable bis-diene oligomers according to formula I, above, include the reaction products of hydroxy functional acyclic or cyclic dienes such as, for example, 2-hydroxymethyl-1,3-butadiene, furfuryl alcohol and the like with organic diisocyanates to form bis-diurethane diene oligomers or with dianhydrides such as, for example, 1,2,4,5-benzenetetracarboxylic anhydride and the like to form bis-ester diene oligomers, or with diepoxide resins such as, for example, Bisphenol A-epichlorohydrin epoxy resin and the like to form bis-diene epoxy oligomers, or with like di-functional reactant or any compatible mixture thereof. Additional suitable bis-diene oligomers according to formula I, above, include the reaction products of amine functional acyclic or cyclic dienes such as, for example, furfuryl amine 2-aminomethyl-1,3-butadiene and the like with any of the aforesaid diisocyanates, dianhydrides, diepoxide resins. Such amine functional diene reactants are generally preferred over the hydroxy functional dienes in view of the enhanced corrosion protection provided by the coating ultimately derived therefrom. Additional suitable bis-diene oligomers are easily prepared by well known methods and will be readily apparent to the skilled of the art in view of the present disclosure.

According to one preferred embodiment of the invention, the bis-diene oligomer comprises bis-diene diurethane oligomer, more preferably hydroxy functional bis-diene diurethane oligomer. Exemplary bis-diene diurethane oligomers can be prepared according to known methods of synthesis by reaction of any of a variety of aromatic or aliphatic diisocyanates with monohydroxy or monoamino or like mono-functionalized diene. Typical examples of suitable dienes include furfuryl alcohol, furfuryl amine, 2-hydroxymethyl-1,3-butadiene, 2-aminomethyl-1,3-butadiene and the like or a compatible mixture of any of them. Numerous additional suitable dienes bearing, preferably, a single functionality reactive with isocyanate functionality are known to the skilled of the art and are commercially available or readily prepared using commercially available reactants according to well known methods. Suitable diisocyanates for reaction with such functionalized dienes to produce the bis-diene diurethane oligomers useful in the coating compositions of the invention include for example, isophorone diisocyanate; toluene diisocyanate,; alkanediisocyanate preferably of about 3 to 8 carbons such as 1,6-hexanediisocyanate; 1-5-pentanediisocyanate; 1,4-butane diisocyanate; 4,4-diphenylmethane diisocyanate and the like and a compatible mixture of any of them. Preferably the diisocyanate has a number average molecular weight (Mn) of about 100–1000, more preferably 100–400.

According to another preferred embodiment of the invention, the bis-diene oligomer comprises bis-diene epoxy oligomer, more preferably hydroxy functional bis-diene epoxy oligomer. Suitable oligomers of this type can be prepared as the reaction product of any of a variety of aromatic or aliphatic diepoxide resins with monohydroxy, monocarboxy or like mono-functionalized diene. Suitable mono-functionalized dienes include, for example, furfuryl alcohol, furoic acid, 1-hydroxymethyl-1,3-butadiene, or the like or a compatible mixture of any of them. In addition, numerous suitable dienes bearing, preferably, a single functionality reactive with epoxide functionality are known to the skilled of the art and are readily synthesized or are commercially available. Preferred diepoxides are terminal diepoxides, that is, diepoxides bearing two terminal epoxide functionality, since these are generally more reactive and therefore require reaction conditions under which undesirable side reactions, for example, epoxy-epoxy reactions and gellation, can be more easily avoided.

Preferably the diepoxide has a number average molecular weight (Mn) between about 100 and about 4500, and more preferably between about 100 and about 1000.

Numerous such preferred diepoxides are readily commercially available, for example, Bisphenol A epichlorohydrin epoxy resin, for example, the Epon (trademark) series, Shell Chemical Company, Houston, Tex., and the DER (trademark) series, Dow Chemical Company, Midland, Mich. Also preferred are cycloaliphatic diepoxy resins, for example the Eponex (trademark) series, Shell Chemical Company, Houston, Tex., and Resin XB2793 (trademark), Ciba-Geigy Corporation, Ardsley, N.Y. (hydantoin epoxy resin).

While lower molecular weight diepoxides are generally preferred, for example Epon 828 (trademark) of the Epon (trademark) series, higher molecular weight diepoxides, for example Epon 1001 and Epon 1004, are suitable to make higher molecular weight oligomers. These, however, provide coating compositions of somewhat higher viscosity at any given solids content and may also be somewhat less preferred since, for example, Epon 1001 and Epon 1004 contain hydroxyl groups which can compete for reaction with the epoxy functionality and produce gellation in the reaction product. This can result in undesirable side reactions, for example, reaction between the epoxy functionality of one diepoxide molecule and such hydroxy functionality of another diepoxide molecule (rather than the hydroxy, amine or other reactive moiety of the ene-functional reactant). The result can be undesirable oligomer properties and gellation. Also, however, improved properties, for example, improved corrosion resistance, have been achieved with coating compositions comprising oligomers prepared using such materials and the choice of suitable oligomer (and reactants for preparing same) will depend upon the particular application intended for the coating composition comprising the oligomer. Also preferred are hydantoin epoxy resins and, where high corrosion resistance is less important, any of a wide variety of acyclic or cyclic aliphatic diepoxides such as, for example, 1,4-butanediol diglycidyl ether and 4-vinylcyclohexene dioxide and the like or a compatible mixture of any of them.

The diepoxide is reacted with the diene according to methods well known to the skilled of the art, preferably by slow addition to sufficient excess of the diene-functional reactant such that substantially every epoxide group reacts with a different diene molecule. Preferably, suitable catalyst such as a chromium catalyst, for example Cordova AMC-2 (trademark), Cordova Chemical Company, Sacramento, Calif., U.S.A. or the like is used to provide higher yields at milder reaction conditions with less epoxy-epoxy reaction which will lead to undesirable gellation.

According to one most preferred embodiment of the present invention, a coating composition is provided which is suitable for application by spray techniques to bare sheet steel automotive vehicle body panels. One most preferred bis-diene oligomer according to such preferred embodiment comprises the reaction product of furfuryl alcohol with isophorone diisocyanate in molar equivalent ratio of about 2:1, respectively. The reaction can be carried out according to known methods including, for example, the use of suitable reaction catalyst such as dibutyl tin dilaurate or the like. Each of the named reactants is readily commercially available at low cost. The molecular weight of the oligomer reaction product is only about 400–800 and coating compositions comprising same have been found to provide extremely low viscosity coating even at low VOC, for example, 30 sec., #4 Ford Cup (27° C.) at VOC of only 3.4 lbs. per gallon. The cured coatings provided thereby have been found to have superior solvent and humidity resistance, corrosion protection and appearance. Other suitable bis-diene oligomers will be readily apparent to the skilled of the art in view of the present disclosure, however, which may be more advantageous for use in other applications and environments. Ultimately, the choice of bis-diene oligomer (and of reactants for preparing same) will depend upon the requisite degree of shelf-stability and the desired rate of cure response and upon the particular application intended for the coating composition comprising the oligomer and for the finished coating.

The bis-dieneophile oligomers which are suitable for use in the novel coating compositions of the invention include many well known to the skilled of the art, a wide variety of which are readily commercially available. The bis-dieneophile oligomers suitable for use in the coating compositions of the invention include those of formula B—R'—B' wherein R' is a bivalent hydrocarbon linking moiety which preferably is substantially unreactive with B and B', that is, R' in the compound B—R'—B' comprises no functionality substantially reactive with either the B or B' moiety. The dieneophile moieties B and B' are the same or different and each is reactive at elevated cure temperature with one or preferably both diene moieties A and A' of the bis-diene oligomers described above. Preferably the bis-dieneophile oligomers are of number average molecular weight about 400–1300. The dieneophile moieties B and B' preferably are each of molecular weight about 50–200. Preferred dieneophile moieties include those according to any one of formulas II-A to II-H:

(II-A)

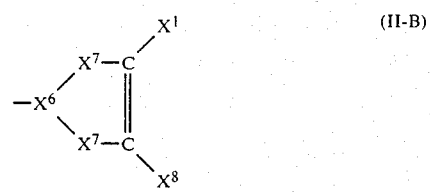

(II-B)

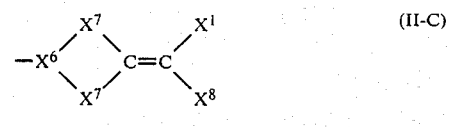

(II-C)

(II-D)

(II-E)

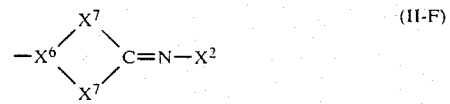

(II-F)

(II-G)

(II-H)

or the like, wherein $X^0$, $X^1$, and each $X^2$ are the same or different as previously defined for formula I; $X^6$ is

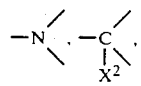

unsubstituted, or mon- or poly-hydroxy substituted or mono- or poly-carboxy substituted or mono- or poly-amino substituted alkanyl-ylidene of 2 to 3 carbons; each $X^7$ is the same or different and each is a covalent bond, —O—,

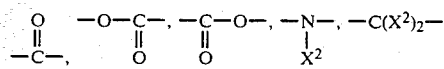

or the like; and $X^8$ is hydrogen, hydroxy, carboxy, amino, straight or branched or cyclo-alkyl, aryl, arylalkyl, cyano, nitro or the like each alkyl, aryl, arylalkyl and alkylene moiety of $X^8$ being unsubstituted, mono- or poly-hydroxy substituted or mono- or polycarboxy substituted or mono- or polyamino substituted; or $X^1$ and $X^8$ together are —$(CX^2)_n$— wherein n is an integer from about 3 to about 7, preferably about 3 to 4. According to a preferred embodiment, the dieneophile moieties B and B' are each:

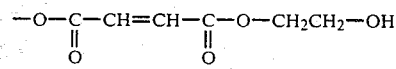

Suitable bis-dieneophile oligomers according to formula II(A-H) include, for example, (i) bis-maleimides, (ii) the reaction products of hydroxy maleates with diepoxides, where hydroxy maleates can be prepared, for example, by reaction of aliphatic or aromatic diols with maleic anhydride, (iii) the reaction products of acrylic or methacrylic acid with diepoxides and the like and a compatible mixture of any of them. Numerous suitable bis-dieneophiles in addition to those specifically identified are readily commercially available and/or readily synthesized from commercially available reactants by known methods and will be apparent to the skilled of the art in view of the present disclosure.

Preferred bis-dieneophile oligomers include bis-ene epoxy oligomers, among which hydroxy functional bis-ene epoxy oligomers according to formula II-A, above, are most preferred. Exemplary such oligomers can be prepared by known methods according to a multi-step synthesis as now described. In a first step, an ene-functional monohydroxy monocarboxylic acid is provided, preferably as the reaction product of aromatic or aliphatic diol with suitable ene-functional cyclic anhydride. The diol reactant can be any of a wide variety of readily commercially available dihydroxy functional materials of which many are known to the skilled of the art. Preferred diols include those of molecular weight about 60–1000, more preferably about 60–400.

Preferred are terminal diols, that is, diols bearing two terminal hydroxyl groups, for example, 1,3-propanediol or ethylene glycol, since these are generally more reactive. Other suitable aliphatic diols include primary/secondary and secondary/secondary carbon hydroxy substituted diols. Diols bearing tertiary hydroxyl groups are least preferred due to their lower reactivity. Preferred aliphatic diols include, for example, aliphatic diols of 2 to about 40 carbons, for example, ethylene glycol, 1,3-propanediol, 1,4-butanediol, 1,5-pentanediol, 2-ethyl-1,3-hexanediol, propylene glycol and the like, or a compatible mixture of any of them. Other suitable aliphatic diols include ether diols, such as triethylene glycol and the like. Suitable aromatic diols include those wherein one or both hydroxy groups are substituted on a benzene ring. Preferred aromatic diols comprise two hydroxyl groups substituted on the same benzene ring or on different benzene rings linked through a covalent bond or through one or more carbons of a one to six carbon, preferably one to four carbon, aliphatic moiety. Suitable aromatic diols include, for example, 4,4'-isopropylidenediphenol (Bisphenol A), 4,4'-(1-methylpropylidene)bisphenol (Bisphenol B), catechol and the like, or a compatible mixture of any of them. In general, aliphatic diols have been found to provide cured coatings or greater flexibility and better corrosion resistance in comparison to aromatic diols. For synthesis of bis-dieneophile oligomer for use in a coating composition according to a most preferred embodiment, specifically a coating composition suitable to be applied by spray techniques to steel automotive vehicle body panels, ethylene glycol is generally most preferred. It has been found that higher diol homologues (e.g., 1,6-hexanediol) yield bis-ene oligomers which provide a lesser reduction of volatile organic content in the coating compositions of the invention. Glycol ether reactants have been found to yield oligomers which provide, ultimately, coatings having somewhat less humidity insensitivity.

Suitable ene-functional cyclic anhydrides for reaction with the above-described diol include any of a variety of readily commercially available materials well known to the skilled of the art. In view of their generally greater reactivity, one class of preferred ene moieties including preferred cyclic anhydrides are those in which one or, more preferably, both end double bond carbons are positioned adjacent a carbonyl moiety. Maleic anhydride is generally most preferred for preparation of bis-dieneophile oligomers for use in coating compositions of the invention, in view of its low molecular weight and since it comprises the ene double bond immediately adjacent both carbonyl moieties. It will be understood that the reaction of the diol with such ene-functional cyclic anhydride may yield a mixed reaction product. Thus, for example, the reaction of maleic anhydride with triethylene glycol yields a mixed reaction product in which ene-functional monohydroxy monocarboxylic acid has been determined (by high pressure liquid chromotography) to be the major reaction product. In such cases, for purposes of defining the present invention, such mixed reaction product, in toto, comprises suitable ene-functional carboxylic acid for preparation of bis-ene oligomer for use in the coating composition of the invention.

Finally, the bis-dieneophile epoxy oligomer for use in the coating composition of the invention is prepared by reaction of the just described ene-functional monohydroxy monocarboxylic acid with suitable diepoxide resin. Suitable and preferred diepoxides include those described above in connection with the synthesis of bis-diene oligomers.

Additional preferred bis-dieneophile oligomers include bis-ene diurethanes according to formula II-A, above. Exemplary such oligomers can be prepared according to known methods by reaction of any of a variety of aromatic or aliphatic diisocyanates with mono-hydroxy or mono-amino or like mono-functionalized ene reactants. Suitable and preferred diisocyanates are those disclosed above in connection with the synthesis of bis-diene diurethane oligomers. Suitable ene reactants include, for example methylolmaleimide, hydroxypropylmethacrylate, allyl alcohol, allyl amine hydroxyethylmethacrylate, hydroxyethylacrylate and the like and a compatible mixture of any of them.

While the bi-dieneophile epoxy oligomers described above are generally most preferred for coating compositions intended for use as a spray-applied primer over bare sheet steel, other bis-dieneophile oligomers will be readily apparent to the skilled of the art in view of the present disclosure, and such other oligomers may be more advantageous for coating compositions intended for use in different applications and environments. Ultimately, the choice of bis-dieneophile oligomer (and of the reactants for preparing same) will depend upon the requisite degree of shelf-stability and the requisite cure response upon the application and environment if use intended for the coating composition and for the cured coating.

According to the most preferred embodiments of the invention, the above-described bis-diene oligomers and bis-dieneophile oligomers are employed in a solvent-based coating composition together with suitable multi-functional crosslinking agent. Suitable crosslinking agent is that which will react with the crosslinking functionality of the oligomers at elevated temperatures during cure of the coating composition. Numerous commercially available crosslinking agents are known to the skilled of the art for use in coating compositions of the invention wherein the oligomers provide, for example, hydroxy functionality which is preferred, or amino functionality or the like for crosslinking reaction. Preferably, however, the crosslinking agent is substantially unreactive, at least at storage temperature, with the diene or dieneophile moieties of the oligomers of the coating composition. Accordingly, the crosslinking reaction is preferred coating compositions of the invention is a reaction separate and distinct from the chain-extension reaction.

Where amino crosslinking functionality is provided by the bis-diene oligomer and/or the bis-dieneophile oligomer, poly-isocyanate functional crosslinking agent can be used. Such poly-isocyanate compounds include, for example, isophorone diisocyanate, toluene diisocyanate, the reaction product of excess diisocyanate with polyols such as, for example, glycerine, trimethylol propane, or the like or a compatible mixture of any of them. Also suitable are any of various commercially available poly-isocyanate crosslinking agents such as, for example, Desmodur L2291 (trademark), Mobay Chemical Company, Pittsburgh, Pa., U.S.A. and the like. Preferably the isocyanate functionality is blocked by reacting same with suitable blocking agent. The blocked poly-isocyanate is selected such that it will remain blocked for long periods of time at normal storage temperatures but will be substantially totally "de-blocked" at elevated cure temperature. Thus, coating compositions can be formulated which are highly shelf-stable, i.e. stable and unreactive at room temperature and, yet, which provide excellent cure response. in addition, since the blocking agent will be released when the coating composition is cured by baking, it is preferred that the blocking agent have high volatility near its de-blocking temperature such that it will diffuse rapidly through the coating and evaporate completely therefrom during the baking step. Any blocking agent allowed to remain in the cured coating should be inert to the cured coating and to the substrate and to any other coatings to be used in conjunction therewith. It will be within the ability of those skilled in the art, in view of the present disclosure, to select a poly-isocyanate crosslinking agent with a blocking agent suitable to provide an unblocking temperature meeting the requirements of a particular application.

It typically will be preferred that the blocked poly-isocyanate crosslinking agent be de-blocked (i.e., that the coating composition be cureable) at a temperature within the range of about 130° C. to 190° C., more typically about 130° C. to 150° C. Accordingly, preferred monofunctional blocking agents are selected from amides, for example caprolactam, phenols, ketoximes and lower alcohols, for example alkanol of from one to eight carbons, for example, methanol, ethanol, any propanol, any butanol, any pentanol, including cyclopentanol, and the like, or a compatible mixture of any of them.

Where the bis-diene oligomers and/or bis-dieneophile oligomers provide hydroxy crosslinking functionality, numerous suitable crosslinking agents are commercially available and well known to the skilled of the art and include, for example, any of a variety of aminoplast crosslinking agents such as partially alkylated melamines (melamine formaldehyde resins modified by alcohols), for example, partially methylated melamines and butylated melamines; polyalkyl ethers of the polymethylol melamines such as hexamethoxy methylmelamine; urea formaldehyde condensate modified by alcohol such as butylated urea resin; polymers of formaldehyde such as paraformaldehyde and trioxane; polymethylol compounds of hexamethylene diurea; adipic acid dimethylol amide and methylol ether thereof; tetramethylolhydrazodicarbonamide; polymethylol compounds of polycaprolactam and methylol ethers thereof; and the like or compatible mixtures of any of them. Other suitable crosslinking agents will be apparent to the skilled of the art in view of the present disclosure. Hexamethoxymethyl melamine is preferred since it is readily commercially available, is of low molecular weight and has been found to provide suitable crosslinking activity.

Network crosslink density in the cured coating can be controlled, and therefore the flexibility and related physical and chemical properties of the cured coating can to a large extent be controlled by selection of suitable oligomers. Crosslink density increases and flexibility decreases as the crosslinking functionality of the oligomers increases and/or as the molecular weight of the oligomers is reduced. Thus, for example, the greater the hydroxy functionality of the oligomers and the lower their molecular weight, the greater will be the degree of crosslinking in the cured coating. In addition, it will be recognized by the skilled of the art in view of the present disclosure that longer chain oligomers, that is, higher molecular weight oligomers will, in general, provide a more viscous coating at a given VOC. Higher molecular weight oligomers of the invention are for that reason less preferred where a high solids coating composition is desired.

The bis-diene oligomer and bis-dieneophile oligomer are used must preferably in molar equivalent ratio of about 1:1. In general, however, a ratio of about 1:0.8 to about 1:1.2, respectively, can be used. The proper proportion of crosslinking agent in the coating composition will depend, in part, upon the properties desired in the coating to be produced. Generally a somewhat less than stoichiometric amount of crosslinking agent can be used to provide a cured coating of greater flexibility. Where, for example, hexamethoxymethyl melamine or the like is employed, it is generally preferred that about 0.5 to about 1.5 equivalents of crosslinking agent functionality (—CH$_2$OCH$_3$) be used per equivalent of oligomer crosslinking functionality provided, in total, by the bis-diene oligomer and the bis-dienophile oligomer. Too much crosslinking agent can produce a coating which is brittle and humidity sensitive. If too little is used, the coating may not cure properly.

The solvent system employed in the coating composition of the invention may be any suitable organic solvent or combination of organic solvents. In general, it will be within the skill of the art to determine a suitable solvent system and a proper volatile organic content for a given coating composition of the invention, for a given application. In this regard, it has been found that the choice of solvent can have a significant effect upon the appearance of the cured coating. In particular, solvent volatility is found to effect coating appearance and, in general, coating appearance has been found to improve as the boiling point is increased and the relative evaporation rate is reduced. Thus, for example, while solvents such as methyl ethyl ketone, methyl isobutyl ketone and the like and mixtures thereof are suitable for application where appearance is less important, solvents such as butyl cellosolve acetate, methyl amyl ketone and the like and mixtures thereof are preferred for improved appearance. Solvents such as methyl amyl ketone and the like are preferred over butyl cellosolve acetate and the like for high solids coating compositions in which lower viscosity at a given solids content is an important consideration. Preferred solvents include, for example, butanol, methyl amyl ketone and the like, or a mixture thereof such as a 1:2 mixture of butanol and methyl amyl ketone, respectively, which is generally preferred for coating compositions intended for automotive vehicle coating operations and the like. Additional suitable solvents are readily commercially available and will be apparent to the skilled of the art in view of the present disclosure.

Any solvent allowed to remain in the cured coating is preferably inert so as to avoid an adverse effect upon the cured coating or upon another coating used in conjunction with it, during the curing process or thereafter. Preferrably, the cured coating is completely free of solvent. The preferred solvents, in addition, have relatively low volatility at temperatures appreciably below their boiling points such that solvent evaporation and loss is low during storage and/or application of the coating composition to the substrate.

Sufficient solvent is used to reduce the viscosity of the coating composition to a level suitable for application to the substrate in the desired manner, for example, brushing, dipping, flow coating, spraying etc. Spraying will generally be preferred, for example, for applying the composition as an automotive primer or topcoat. In such spraying applications, the oligomers of the invention are especially advantageous for formulating coating compositions of the invention which are high solids compositions. In this regard, coating compositions of the invention employing preferred oligomers described above are suitable to be applied to a substrate by spraying even though formulated at volatile organic content levels as low as about 3.0 to 3.5 g/l to provide a spray viscosity of 25–35 sec., #4 Ford Cup at 27° C. (80° F.). Conventional epoxy ester-type automotive spray-applied primer coating compositions typically require a volatile organic content of about 540 g/l. For a high solids, sprayable, automotive vehicle primer, for example, the solvent can comprise preferably about 25 to about 35 percent by weight of the total coating compositions, although, of course, larger or smaller amounts may be utilized depending upon the solids content desired. For example, it may be desirable to formulate the primer with a relatively high solids content for storage and to then reduce it to spraying consistency immediately prior to the time of application. Of course, the coating compositions of the invention need not be formulated as a "high solids" composition, but rather can have a higher VOC to provide a lower viscosity. In general, it is preferred that sufficient solvent be used to provide a viscosity of about 15 to 35 sec., #4 Ford Cup at 27° C. (80° F.). According to preferred embodiments described above, this is equivalent to greater than approximately 60 weight percent solids content.

Also preferably included in the coating composition of the invention is any of a variety of acid catalysts known to the skilled of the art to catalyze the aminoplast crosslinking reaction, for example, p-toluenesulfonic acid, phosphoric acid, phenyl acid phosphate, butyl phosphate, butyl maleate, and the like or a compatible mixture of any of them. If the coating compositions provide amino crosslinking functionality and the crosslinking agent is blocked poly-isocyanate functional, then any of a variety of catalysts for the isocyanate de-blocking reaction can also be included in the coating composition, for example, dibutyl tin dilaurate. In addition, a flow control agent, for example, polybutyl acrylate; a wetting agent, for example, silicone; pigment(s); a pigment dispersent; and/or a corrosion inhibitor, for example, chromate pigment, numerous of all of which are known to the skilled of the art, may be employed in the coating compositions of the invention. In addition, chromate pigments have been found to improve the humidity resistance of cured films made of the coating compositions of the invention, wherein only very mild cure conditions were used, e.g., as little as about 15 minutes at about 135° C.

Exemplary substrates to which the coating composition of the invention can be applied include metal substrates, for example, aluminum, steel, or phosphated cold-rolled steel. In general, any metal known to be used as a construction material is a suitable substrate.

Following application to the substrate, the coating is then cured at elevated temperatures by any convenient means such as baking ovens or banks of infra-red heat lamps for sufficient time at sufficiently elevated temperature to substantially complete the diene/dieneophile chain extension reaction and the crosslinking reaction. The time and temperature required to cure the coating are interrelated and depend upon the particular oligomers, crosslinking agent, solvent and other materials, if any, and the amount of each comprising the coating composition. selecting preferred components as described above, the bake time and temperature is typically about 8 to 30 minutes at about 120° C. to 180° C.

Cured coatings according to the invention have been found to provide excellent corrosion resistance when applied over metallic substrates, for example, when applied as an automotive vehicle primer coat over bare sheet steel. In particular, exceptional corrosion inhibition is provided by preferred embodiments described above which comprise oligomers having no ester linkages. Ester linkages are found to be attacked by hydroxide, a product of the metal corrosion process. Moreover, high solids coating compositions according to the present invention, comprising chain-extendable, crosslinkable bis-diene oligomers and bis-dieneophile oligomers of the invention, especially the preferred oligomers described above, with aminoplast crosslinking agent such as hexamethoxymethyl melamine, have been found to afford cured coatings with corrosion resistance comparable to conventional epoxy ester based, low solids sprayable coating compositions. The significant reduction in volatile organic content provided by the coating composition presents, therefore, a highly advantageous advance in the art.

A most preferred use of the coating composition of the invention is as a high solids sprayable primer for use on a bare metal substrate such as a household or industrial appliance housing or an automotive vehicle body. Such primer compositions typically are pigmented and any pigments commonly included in primer compositions for metal substrates and acrylic dispersion topcoats such as, for example, carbon black, iron oxide, magnesium, silicate, silica, barium sulfate, TiO$_2$, chrome yellow, calcium chromate, strontium chromate, zinc potassium chromate and the like may be used. The primer can be pigmented according to known methods including, for example, by grinding pigments in a portion of the curable resin and adding to the primer composition.

The pigment-to-binder ratio of the primer may be as much as 4:1 by weight, respectively, depending, in part, upon the condition of the metal substrate. It is preferred, however, to use a primer having a pigment-to-binder ratio of about 1:1–2:1 by weight, respectively.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

While not wishing to be bound by theory, it is presently understood that during the curing process at elevated temperature, the bis-diene oligomer and bis-dieneophile oligomer chain-extend by reaction with each other through Diels Alder cycloaddition chemistry to form polymers bearing hydroxy functionality or other crosslinking functionality. Crosslinking occurs concurrently with chain-extension during cure. Taking the bis-dieneophile oligomer to be a bis-ene oligomer for purposes of illustration, it is presently understood that the ene/diene reaction results in the formation of a cyclic six membered ring:

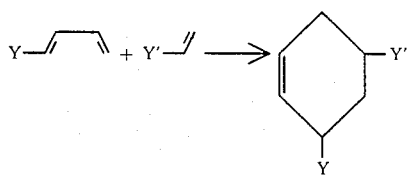

In like manner, the cycloaddition reaction of a cyclic diene with an ene moiety yields a bicyclic carbon-carbon linkage:

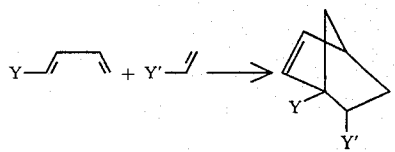

Such Diels Alder reactions have been studied and several parameters have been identified which affect reactivity. Exemplary such work is found in P. Wasserman, "Diels Alder Reactions", Elsevier Publishing Co., New York, 1965, which is incorporated herein by reference. Such parameters are found to include most notably the selection of the substituent groups on the diene and dieneophile moieties, steric hendrance at the reaction site and molecular orientation. In this regard, it is one characterizing aspect of the present invention that the substituent groups on the diene functionality and on the dieneophile functionality of the oligomers employed in the coating compositions of the invention are selected to provide the desired degree of chain-extension reactivity in the coating composition. In particular, the degree of reactivity is increased by ene moiety substitution groups which, in net effect, are electron withdrawing, that is, which increase the electron affinity of the ene functionality double bond. Thus, for example, reactivity is increased by electron withdrawing ene substitution groups such as nitro, cyano, ester (i.e.,

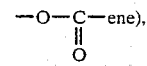

nitrile, carbonyl, straight, branched or cyclo alkyl or alkylene, arylene, aralkylene, —O—, —NR—, —S— and the like. Similarly, it will be understood by the skilled of the art in view of the present disclosure, that the shelf stability of the coating composition is enhanced by ene moiety substitution groups which, in net effort, are electron donating, that is, which decrease the electron affinity of the ene functionality double bond. Thus, shelf life is increased by substituent groups such as, for example, amine and ether linkages, sulfoxide, sulfone, urethane and the like.

It will be within the ability of those skilled in the art, in view of the present disclosure, to select dieneophile substituent groups which provide, in net effect the desired compromise between shelf stability and reactivity. It generally is preferred that no electron donating group(s) be substituted directly on either carbon of the ene functionality double bond, nor on any adjacent or next adjacent atom. In certain appliations, however, particularly where extended shelf life is of paramount importance, such electron donating groups can be tolerated, more preferably in conjunction with electron withdrawing group(s) of greater effect, and with sufficient chain-extension reaction catalyst, higher cure temperatures, longer cure periods, or a combination thereof.

In view of the present disclosure, it will be appreciated by the skilled of the art that in accordance with the foregoing discussion, coating compositions of the invention are rendered more reactive by bis-diene oligomers wherein the diene moiety substitution groups are electron donating in net effect, that is, wherein the electron affinity of the diene double bond is increased. Likewise, electron withdrawing groups on the diene moiety increase the shelf stability of the coating composition. It generally is preferred that no electron withdrawing group(s) be substituted directly on any carbon of either diene functionality double bond, nor on any adjacent or next adjacent atom. As noted above, however, in certain applications a coating composition of the invention may require extended shelf life or for some other reason call for or tolerate bis-diene oligomers comprising electron withdrawing substitution groups on the diene moiety.

The invention will be further understood by referring to the following detailed examples. It should be understood that the specific examples are presented by way of illustration and not by way of limitation. Unless otherwise specified, all references to "parts" are intended to mean parts by weight.

EXAMPLE I

This example illustrates the preparation of bis-diene oligomers from aliphatic diisocyanates and hydroxy functional cyclic diene. To a solution of 500 g (2.25 mole) isophorone diisocyanate in 224 g methyl amyl ketone and 2.3 g dibutyl tin dilaurate was added 441 g (4.5 mole) furfuryl alcohol. The rate of addition was controlled so as to maintain a reaction temperature of 60°–80° C. After the addition of the furfuryl alcohol, the reaction was heated at 60°–80° C. until all the diisocyanate was consumed as determined by the absence of the —N=C=O IR absorption at 2250 cm$^{-1}$.

EXAMPLE II

This example illustrates the preparation of bis-diene oligomer from aliphatic diisocyanate and hydroxy functional cyclic dienes. To a solution of 391.5 g (2.25 mole) toluene diisocyanate in 224 g methyl amyl ketone and 1.0 g dibutyl tin dilaurate was added 441 g (4.5 mole) furfuryl alcohol. The rate of addition was controlled so as to maintain a reaction temperature of 60°–80° C. After the addition of the furfuryl alcohol, the reaction was heated at 60°–80° C. until all diisocyanate was consummed as determined by the absence of the —N=C=O IR absorption at 2250 cm$^{-1}$.

EXAMPLE III

This example illustrates the preparation of bis-diene oligomers from aliphatic diisocyanate and an amino functionalized diene. To a solution of 500 g (2.25 mole) isophorone diisocyanate in 224 g methyl amyl ketone:-butyl acetate (3:1) is added 441 g (4.5 mole) furfuryl amine. The rate of addition is controlled so as to maintain a reaction temperature of 60°–80° C. After the addition of the amine, the reaction is heated at 60°–80° C. until all diisocyanate has been consumed as determined by the absence of the —N=C=O IR absorption at 2250 cm$^{-1}$.

EXAMPLE IV

This example illustrates the preparation of bis-diene oligomers from aromatic diisocyanate and an amino functionalized diene. To a solution of 391.5 g (2.25 mole) toluene diisocyanate in 224 g methyl amyl ketone:butyl acetate (3:1) is added 441 g (4.5 mole) furfuryl amine. The rate of addition is controlled so as to maintain a reaction temperature of 60°–80° C. After the addition of the amine, the reaction is heated at 60°–80° C. until all the diisocyanate has been consumed as determined by the absence of the —N=C=O IR absoption at 2250 cm$^{-1}$.

EXAMPLE V

This example illustrates the preparation of bis-diene oligomers from aliphatic diisocyanate and hydroxy functional acyclic diene. To a solution of 500 g (2.25 mole) isophorone diisocyanate in 224 g methyl amyl ketone is added 378 g (4.5 mole) 2-hydroxymethyl-1,3-butadiene. The rate of addition is controlled so as to maintain a reaction temperature of 60°–80° C. After the addition of the alcohol, the reaction is heated at 60°–80° C. until all diisocyanate is consumed as determined by the absence of the —N=C=O IR absoption at 2250 cm$^{-1}$.

EXAMPLE VI

This example illustrates the preparation of bis-diene oligomers from aromatic diisocyanate and acyclic hydroxy functional diene. To a solution of 391.5 g (2.25 mole) toluene diisocyanate in 224 g methyl amyl ketone was added 378 g (4.5 mole) 2-hydroxymethyl-1,3-butadiene. The rate of addition is controlled so as to maintain a reaction temperature of 60°–80° C. After the addition of the alcohol, the reaction is heated at 60°–80° C. until all diisocyanate is consumed as determined by the absence of the —N=C=O IR absorption at 2250 cm$^{-1}$.

EXAMPLE VII

This example illustrates the preparation of bis-diene oligomers from an aromatic epoxy resin and a cyclic hydroxy functional diene. A mixture comprising 380 g Epon 828 (2 epoxide equivalents), 196 g (2 mole) furfuryl alcohol and 1 g N,N-dimethylethanol amine was heated together at 130°–140° C. under an inert atmosphere of argon gas. The reaction was allowed to proceed until all epoxide functionality was consumed as determined by the absence of the —N=C=O IR absoption at 2250 cm$^{-1}$. Methyl amyl ketone (144 g) was then added to reduce viscosity.

EXAMPLE VIII

This example illustrates the preparation of bis-diene oligomers from aliphatic epoxy resin and cyclic hydroxy functional dienes. A mixture comprising 400 g Eponex 151 (2 epoxide equivalents), 196 g (2 mole) furfuryl alcohol and 1 g N,N-dimethylethanol amine is heated together at 130°–140° C. under an inert atmosphere of argon gas. The reaction is allowed to proceed until all epoxide functionality was consumed as determined by the absence of the —N=C=IR absoption at 2250 cm$^{-1}$. Methyl amyl ketone (144 g) was then added to reduce viscosity.

EXAMPLE IX

This example illustrates the preparation of bis-ene oligomers from an aromatic epoxy resin.

Part A—Hydroxy functional maleic acid

To a mixture of 253 g (4 mole) ethylene glycol in 266.4 g methyl amyl ketone heated at 40°–60° C. was added in several portions 400 g (4 mole) maleic anhydride. The temperature was maintained at 40°–60° C. for 4 hours until all anhydride was consumed. The hydroxy acid was cooled to room temperature and stored.

Part B—bis-Ene oligomer

The entire reaction product (519.4 g) of Part A was added dropwise to a solution of 768 g (4 epoxide equivalents) Epon 828 and 5 g Cordova AMC-2 (trademark) catalyst available from Cordova Chemical Company, Sacramento, Calif., U.S.A. in 100 g of methyl amyl ketone maintained at 60°-90° C. under an inert atmosphere of argon. After the addition, the reaction was heated at 60°-90° C. until all epoxide functionality was consummed (about 4-5 hours). The oligomer solution was cooled to room temperature and stored for future use.

EXAMPLE X

This example illustrates the preparation of bis-ene oligomers from an aliphatic epoxy resin. To a solution of 800 g (4 epoxide equivalents) of Eponex 151 and 5 g Cordova AMC-2 (trademark) catalyst in 100 g of methyl amyl ketone is added 520 g of the hydroxy functional maleic acid prepared in Part A, Example IX. The temperature of the reaction is maintained at 60°-90° C. during the addition of the acid and for about four hours thereafter. The resulting epoxide free product was cooled to room temperature and stored.

EXAMPLE XI

This example illustrates the preparation of bis-ene oligomers from aromatic epoxy resins and unsaturated carboxylic acid. To a solution of 768 g (4 epoxide equivalents), Epon 828 and 5 g Cordova AMC-2 (trademark) catalyst in 200 g methyl amyl ketone is added dropwise 288 g (4 mole) acrylic acid. The temperature is maintained at 60°-90° C. during the addition and for 4-5 hours thereafter. The resulting epoxide free oligomer is cooled to room temperature and stored for future use.

EXAMPLE XII

This example illustrates the preparation of a hydroxy-free bis-ene diurethane oligomer.

Part A—Isocyanate functional ene

To a solution of 222 g (1 mole) isophorone diisocyanate and 0.2 g dibutyl tin dilaurate in 75 g methyl amyl ketone is added a solution of 116 g (1 mole) hydroxy ethyl acrylate in 30 g methyl amyl ketone. The rate of addition is controlled so as to maintain a reaction temperature of 60°-60° C. After the addition the reaction is heated for an additional 1 hour at 60°-80° C. and subsequently stored at room temperature.

Part B—Hydroxy-free bis-ene diurethane oligomer

To a mixture of 45 g (0.5 mole) 1.4 butane diol in 50 g methyl amyl ketone was added dropwise the entire reaction product (413 g) of Part A. The temperature of the reaction was maintained at 60°-80° C. during the addition and for four hours thereafter. The resulting hydroxy-free bis-ene diurethane oligomer was cooled to room temperature and stored.

EXAMPLE XIII

This example illustrates the preparation of an especially reactive hydroxy free bis-ene diurethane oligomer.

Part A—Isocyanate functional maleimide

The procedure of Example XII, Part A, is repeated except that 111 g (1 mole) methylol maleimide was used instead of the hydroxy ethyl acrylate.

Part B—Hydroxy-free bis-ene diurethane oligomer

The reaction procedure of Example XII, Part B, is repeated except that the reaction product of this Example, Part A, is used instead of the reaction product of Example XII, Part A. The resulting hydroxy-free bis-ene diurethane oligomer was cooled to room temperature and stored.

EXAMPLE XIV

This example illustrates the preparation of a pigmented coating composition according to the present invention. The following typical pigment package is used:

Barytes: 43.8 g
Iron Oxide: 12.0 g
Titanium Dioxide: 3.5 g
Silica: 1.5 g
Zinc Chromate: 1.2 g is combined with the bis-diene oligomer to be used in the coating composition. The mixture is ground according to well known methods until a Hegman Gage reading of 7-8 is achieved. The resulting mill base is combined with the bis-ene oligomer to be used in the coating composition and mixed until substantially homogeneous. The resulting composition, after thinning by addition of suitable solvent and filtering, is suitable for use as a primer, for example, on automobile vehicle body panels.

EXAMPLES XV-XXII

A high solid level primer composition according to the invention is prepared by the procedure of Example XIV, employing the following materials:

EXAMPLE XV bis-diene oligomer of Example I: 33.5 g
bis-ene oligomer of Example IX: 61.9 g
Cymel 301[1]: 16.8 g
methyl amyl ketone: 29.0 g
methanol: 6.0 g
poly-butyl acrylate (flow control agent): 0.7 g

EXAMPLE XVI bis-diene oligomer of Example II: 30.0 g
bis-ene oligomer of Example IX: 61.9 g
Cymel 301[1]: 16.8 g
methyl amyl ketone: 29.0 g
methanol: 6.0 g
poly-butyl acrylate (flow control agent): 0.7 g

EXAMPLE XVII bis-diene oligomer of Example III: 33.5 g
bis-ene oligomer of Example IX: 61.9 g
Cymel 301[1]: 16.8 g
methyl amyl ketone: 29.0 g
methanol: 6.0 g
poly-butyl acrylate (flow control agent): 0.7 g

EXAMPLE XVIII bis-diene oligomer of Example IV: 30.0 g
bis-ene oligomer of Example IX: 61.9 g
Cymel 301[1]: 16.8 g
methyl amyl ketone: 29.0 g
methanol: 6.0 g
poly-butyl acrylate (flow control agent): 0.7 g

EXAMPLE XIX bis-diene oligomer of Example VII: 52.0 g
bis-ene oligomer of Example IX: 61.9 g
Cymel 301[1]: 16.8 g
methyl amyl ketone: 29.0 g
methanol: 6.0 g poly-butyl acrylate (flow control agent): 0.7 g

EXAMPLE XX bis-diene oligomer of Example I: 33.5 g
bis-ene oligomer of Example X: 61.9 g
Cymel 301[1]: 16.8 g
methyl amyl ketone: 29.0 g
methanol: 6.0 g
poly-butyl acrylate (flow control agent): 0.7 g

EXAMPLE XXI bis-diene oligomer of Example I: 33.5 g
bis-ene oligomer of Example XI: 59.5 g
Cymel 301[1]: 16.8 g
methyl amyl ketone: 29.0 g
methanol: 6.0 g
poly-butyl acrylate (flow control agent): 0.7 g

EXAMPLE XXII bis-diene oligomer of Example VIII: 58.0 g
bis-ene oligomer of Example XII: 41.0 g
Cymel 301[1]: 16.8 g
methyl amyl ketone: 29.0 g
methanol: 6.0 g
poly-butyl acrylate (flow control agent): 0.7 g

[1]Trademark, American Cyanamid Company, Wayne, N.J., U.S.A. (hexamethoxymethylmelamine crosslinking agent)

In view of this disclosure, many modifications of this invention will be apparent to those skilled in the art. It is intended that all such apparent modifications fall within the true scope of this invention and be included within the terms of the appended claims.

INDUSTRIAL APPLICABILITY

It will be apparent from the foregoing that this invention has industrial applicability as a coating composition, especially as a high solids primer coating composition for sheet steel and the like used in automotive vehicles, household appliances and the like, and other applications where the coating composition desirably has excellent storage stability and the cured coating desirably provides excellent humidity and solvent resistance to protect the substrate against corrosion, wear and the like.

What is claimed is:

1. A novel thermosetting, solvent-based crosslinkable coating composition comprising:
    (A) bis-diene oligomer of number average molecular weight about 300-5000, having the general formula A—R—A', wherein A and A' are the same or different and each comprises a substituted or unsubstituted monovalent diene moiety;
    (B) bis-dieneophile oligomer of number average molecular weight about 400-1200, having the general formula B—R'—B', wherein B and B' are the same or different and each comprises a substituted or unsubstituted dieneophile moiety reactive with said diene moieties A or A' at elevated cure temperature; said R and R' being the same or different and each being a bivalent hydrocarbon linking moiety which is substantially unreactive with A, A', B and B';
    wherein said bis-dieneophile oligomer consists essentially of bis-ene epoxy oligomer which is the reaction product of ene-functional monohydroxy monocarboxylic acid with aromatic or aliphatic diepoxide reactant and wherein at least one of A—R—A' and B—R'—B' bears crosslinking functionality other than diene and dieneophile functionality;
    (C) crosslinking agent substantially reactive with said crosslinking functionality at said elevated cure temperature, wherein said crosslinking agent is selected from the group consisting of polyisocyanates, aminoplasts and formaldehyde polymers; and
    (D) organic solvent.

2. The novel thermosetting, solvent-based crosslinkable coating composition of claim 1, wherein each said diene moeity A and A' of said bis-diene oligomer has the general formula:

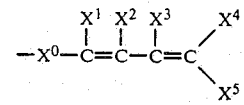

wherein $X^0$ is —O—,

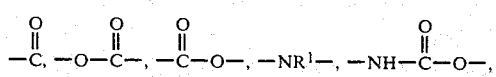

—$C(R^1)_2$— or the like, wherein $R^1$ is hydrogen, straight, branched or cyclo alykl, aryl, arylalkyl, or the like, and each $R^2$ is the same or different and each is hydrogen, hydroxy, carboxy, amine, straight, branched or cyclo alkyl, aryl, arylalkyl, or the like, each alykl, aryl and arylalkyl moiety of $R^1$ and $R^2$ being unsubstituted or mono- or poly-hdroxy substituted or mono- or poly-carboxy substituted or mono- or poly-amino substituted; and $X^1$, $X^2$, $X^3$ $X^4$ and $X^5$ are the same or different and each in hydrogen, hydroxy, carboxy, amino, straight or branched or cyclo alykl, aryl, arylalkyl, cyano, nitro or the like, or $X^1$ and $X^5$ together are alkylene, —O—, —$NR^1$— where $R^1$ is as defined above, or like divalent group, each alkyl, aryl, arylalkyl and alkylene moiety of $X^1$, $X^2$, $X^3$ and $X^4$ and $X^5$ being unsubstituted or mono- or poly-hydroxy substituted or mono- or poly-carboxy substituted or mono- or poly-amino substituted.

3. The novel thermosetting, solvent-based crosslinkable coating composition of claim 2, wherein the substituents $X^0$, $X^1$, $X^2$, $X^3$, $X^4$ and $X^5$, in net effect, decrease the electron affinity of the diene double bonds.

4. The novel thermosetting, solvent-based crosslinkable coating composition of claim 1, wherein each of A and A' are each:

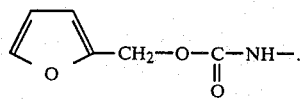

5. The novel thermosetting, solvent-based crosslinkable coating composition of claim 1, wherein said bis-diene oligomer is of number average molecular weight about 300-1200.

6. The novel thermosetting, solvent-based crosslinkable coating composition of claim 1, wherein said bis-diene oligomer comprises the reaction product of a first reactant selected from the group consisting of hydroxy functional acyclic or cyclic diene reactant, amine functional acyclic or cyclic diene reactant and a compatible mixture of any of them with a second reactant selected from the group consisting of aliphatic or aromatic diisocyanate, dianhydride, and a compatible mixture of any of them.

7. The novel thermosetting, solvent-based crosslinkable coating composition of claim 6, wherein said second reactant consists essentially of aromatic or aliphatic diisocyanate or a mixture thereof and said first reactant is selected from the group consisting of 2-aminomethyl-1,3-butadiene, furfuryl alcohol, furfuryl amine and a compatible mixture of any of them.

8. The novel thermosetting, solvent-based crosslinking coating composition of claim 7, wherein said second reactant is selected from the groups consisting of isophorone diisocyanate, toluene diisocyanate, alkanediisocyanate of about 3 to 8 carbons, diphenylmethane diisocyanate and a compatible mixture of any of them.

9. The novel thermosetting, solvent-based crosslinkable coating composition of claim 1, wherein each said dieneophile moiety B and B' of said bis-dieneophile oligomer has any one of the general formulas II-A to II-H:

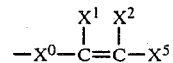 (II-A)

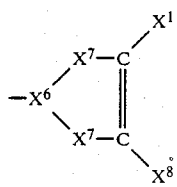 (II-B)

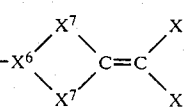 (II-C)

 (II-D)

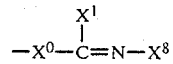 (II-E)

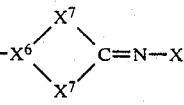 (II-F)

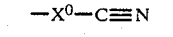 (II-G)

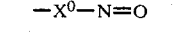 (II-H)

wherein $X^0$ is —O—,

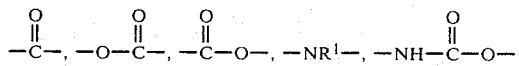

or —C($R^2$)$_2$— wherein $R^1$ is hydrogen, straight, branched or cyclo alkyl, aryl or arylalkyl and each $R^2$ is the same is different and each is hydrogen, hydroxy, carboxy, amine, straight, branched or cyclo alkyl, aryl or arylalkyl, each alkyl, aryl and arylalkyl moiety of $R^1$ and $R^2$ being unsubstituted or mono- or poly-hydroxy substituted or mono- or poly-carboxy substituted or mono- or poly-amino substituted; $X^6$ is

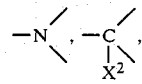

unsubstituted, or mono- or poly-hydroxy substituted or mono- or poly-carboxy substituted or mono- or poly-amino substituted alkanyl-ylidene of 2 or 3 carbons; each $X^7$ is the same or different and each is a covalent bond, —O—,

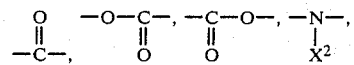

or —C($X^2$)$_2$—; $X^8$ is hydrogen, hydroxy, carboxy, amino, straight or branched or cyclo-alkyl, aryl, arylalkyl, cyano or nitro; or $X^1$ and $X^8$ together are —(CX$^2$)$_n$— wherein n is an integer from about 3 to about 7, preferably about 3 to 4; and $X^1$ and each $X^2$ are the same or different and each is hydrogen, hydroxy, carboxy, amino, straight or branched or cyclo alkyl, aryl, arylalkyl, cyano or nitro, each alkyl aryl, arylalkyl and alkylene moiety of $X^1$ and $X^2$ being unsubstituted or mono- or poly-hydroxy substituted or mono- or poly-carboxy substituted or mono- or poly-amino substituted.

10. The novel thermosetting solvent-based crosslinkable coating composition of claim 9, wherein the substituents $X^0$, $X^1$, $X^2$ $X^6$, $X^7$, and $X^8$, in net effect, increase the electron affinity of the dieneophile double bond.

11. The novel thermosetting, solvent-based crosslinkable coating composition of claim 9, wherein each of B and B' is $$-O-\underset{\underset{O}{\|}}{C}-CH=CH-\underset{\underset{O}{\|}}{C}-O-CH_2CH_2-OH.$$

12. The novel thermosetting solvent-based crosslinkable coating composition of claim 1, wherein said enefunctional monohydroxy monocarboxylic acid consists essentially of the reaction product of aromatic or aliphatic diol with ene-functional cyclic anhydride.

13. The novel thermosetting solvent-based crosslinkable coating composition of claim 12, wherein said diol is selected from the group consisting of ethylene glycol, triethylene glycol, propylene, glycol, 1,3-propanediol, 1,4-butanediol, 1,5-pentanediol, 2-ethyl-1,3-hexanediol, 4,4-isopropylidenediphenol, 4,4-(1-methylpropylidene)-bisphenol, catechol and a compatible mixture of any of them.

14. The novel thermosetting solvent-based crosslinkable coating composition of claim 12, wherein said enefunctional cyclic anhydride consists essentially of maleic anhydride.

15. The novel thermosetting solvent-based crosslinkable coating composition of claim 1, wherein said diepoxide reactant consists essentially of terminal diepoxide.

16. The novel thermosetting solvent-based crosslinkable coating composition of claim 1, wherein said diepoxide reactant has a number average molecular weight (Mn) between about 100 and about 4500.

17. The novel thermosetting solvent-based crosslinkable coating composition of claim 1, wherein said diepoxide reactant is selected from the group consisting of Bisphenol A epichlorohydrin epoxy resin, 1,4-butanediol diglycidyl ether, 4-vinylcyclohexene dioxide, cycloaliphatic diepoxy resin, hydantoin epoxy resin and a compatible mixture of any of them.

18. The novel thermosetting, solvent-based crosslinkable coating composition of claim 1, wherein said crosslinking agent is selected from the group consisting of polyalkoxy functional monomeric melamine or polymeric melamine, or polymeric urea crosslinking agent and a mixture of any of them.

19. The novel thermosetting, solvent-based crosslinkable coating composition of claim 1, wherein said crosslinking agent consists essentially of hexamethoxymethylmelamine.

20. The novel thermosetting, solvent-based crosslinkable coating composition of claim 1 further comprising acid catalyst for a crosslinking reaction between said crosslinking functionality and said crosslinking agent.

21. The novel thermosetting, solvent-based crosslinkable coating composition of claim 20, wherein said acid catalyst consists essentially of para-toluene sulfonic acid.

22. The novel thermosetting, solvent-based crosslinkable coating composition of claim 1 further comprising Lewis acid catalyst for cycloaddition chain extension reaction between said bis-diene oligomer and said bis-dieneophile oligomers.

23. The novel thermosetting, solvent-based crosslinkable coating composition of claim 22, wherein said Lewis acid catalyst is selected from the group consisting of aluminum chloride, zinc chloride and the like or a mixture thereof.

24. The novel thermosetting, solvent-based crosslinkable coating composition of claim 1, wherein said crosslinking agent consists essentially of an aminoplast crosslinking agent and said coating composition further comprises protic acid catalyst for crosslinking reaction of said crosslinking agent with said crosslinking functionality.

* * * * *